United States Patent
Swarovski

[11] Patent Number: 6,136,399
[45] Date of Patent: Oct. 24, 2000

[54] DECORATIVE ARTICLE FOR GARMENT

[75] Inventor: Helmut Swarovski, Fritzens, Austria

[73] Assignee: D. Swarovski & Co., Wattens, Austria

[21] Appl. No.: 08/913,707

[22] PCT Filed: Feb. 4, 1997

[86] PCT No.: PCT/AT97/00019

§ 371 Date: Sep. 22, 1997

§ 102(e) Date: Sep. 22, 1997

[87] PCT Pub. No.: WO97/41746

PCT Pub. Date: Nov. 13, 1997

[30] Foreign Application Priority Data

May 3, 1996 [AT] Austria ................................. A 794/96

[51] Int. Cl.$^7$ ............................. B32B 5/16; G02B 5/13; G02B 5/124

[52] U.S. Cl. ................ 428/42.1; 428/66.5; 428/142; 428/542.2; 428/913.3; 359/518; 359/534; 359/543

[58] Field of Search ............................. 428/7, 13, 542.2, 428/913.3, 15, 42.1, 66.5; 359/518, 534, 543

[56] References Cited

U.S. PATENT DOCUMENTS

| | | |
|---|---|---|
| Re. 20,731 | 5/1938 | Schiller et al. . |
| 1,903,385 | 4/1933 | Schiller . |
| 3,357,772 | 12/1967 | Rowland et al. . |
| 3,758,192 | 9/1973 | Bingham ................................. 350/105 |
| 3,874,784 | 4/1975 | Eigenmann ............................. 650/109 |
| 3,981,557 | 9/1976 | Eigenmann ............................. 350/104 |
| 4,341,443 | 7/1982 | Robinson .................................. 350/98 |
| 4,605,461 | 8/1986 | Ogi ......................................... 156/233 |
| 4,889,409 | 12/1989 | Atcheson . |
| 5,232,752 | 8/1993 | Crespi et al. . |
| 5,468,540 | 11/1995 | Lu . |
| 5,981,032 | 11/1999 | Smith et al. ............................. 428/167 |
| 6,015,214 | 1/2000 | Heenan et al. ........................... 359/529 |

FOREIGN PATENT DOCUMENTS

| | | |
|---|---|---|
| 0 693 697 | 1/1996 | European Pat. Off. . |
| 853 030 | 3/1940 | France . |
| 407 110 | 3/1934 | United Kingdom . |
| 1 325 293 | 8/1973 | United Kingdom . |
| 2 085 211 | 4/1982 | United Kingdom . |

*Primary Examiner*—H. Thi Le
*Attorney, Agent, or Firm*—Wenderoth, Lind & Ponack, L.L.P.

[57] ABSTRACT

Decoration for a garment, comprising individual elements (1) of glass or synthetic material, whose back is provided with an adhesive means (2) bounded by a flat adhesive surface (3), wherein each element (1) comprises a retroreflector (11) whose front is bounded by a transparent convex, in particular spherical, incident surface (7), whereas the curved back (4) coated with reflecting material extends essentially in the focal surface of incident light.

20 Claims, 4 Drawing Sheets

Fig. 1
Fig. 2
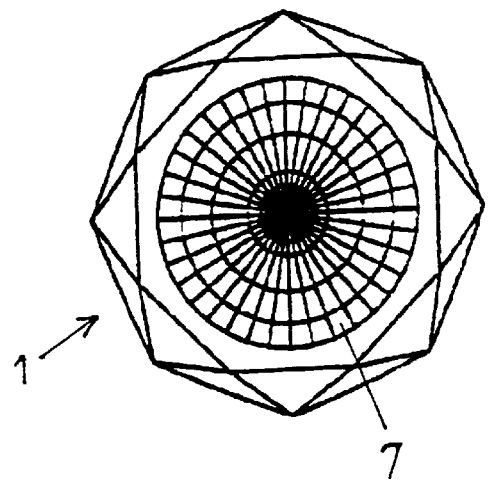
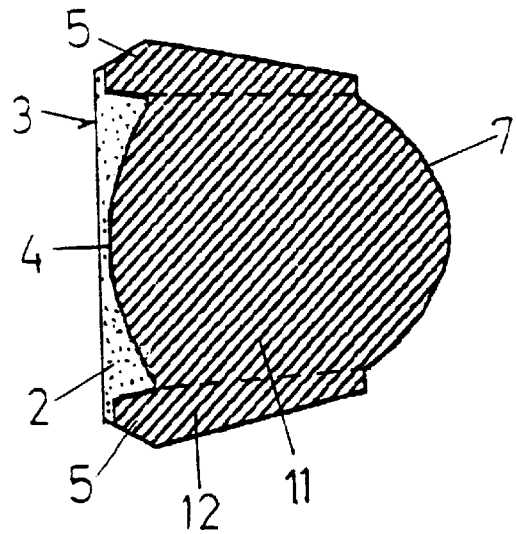
Fig. 3
Fig. 4
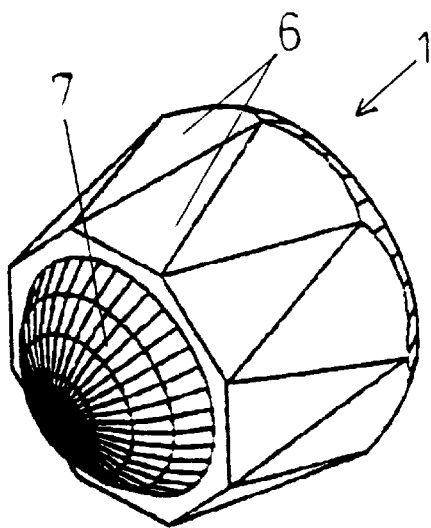
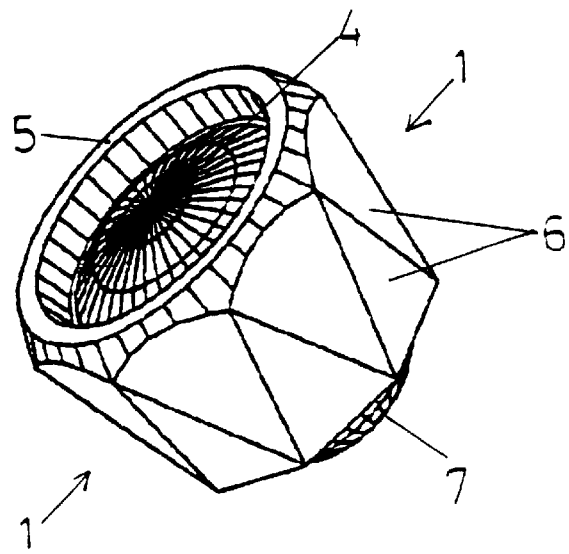

DECORATIVE ARTICLE FOR GARMENT

BACKGROUND OF THE INVENTION

The invention relates to decoration or decorative articles or elements for a garment, including individual elements of glass or synthetic material, each having a back provided with an adhesive defining a flat adhesion surface.

Such elements are produced with various surface configurations, colors and materials. Application of such elements conventionally takes place by placing the elements, which are fastened with their front surface on an adhesive film, on an ironing pad and connecting them permanently at their adhesive surfaces with a garment under the effect of pressure and temperature. It is critical that none of the elements forming a pattern become detached from the garment since breaking a regular pattern is immediately apparent as being unattractive and cancels the decorative effect.

In order to ensure reliable adhesion of the elements on a substrate comprising textiles, leather or synthetic material, efforts have been made in the past (cf. GB 1 325 293) to provide the decorative elements to be as flat as possible so that forces acting from the outside, such as are unavoidable especially during a laundry process, generate only low moments in the adhesive surface, for that reason it was not obvious to use the elements in the form of retroreflectors for the decoration of garments. A retroreflector is understood to be an optical element having a front bounded by a transparent, convex, in particular spherical, incident surface, and a curved back coated with a reflecting material extending essentially in the focal surface of incident light. At customary values of the coefficient of refraction, this condition is only fulfilled with an element whose height is greater than its diameter.

In order to be able to affix retroreflectors on crash barriers, check posts, etc., they are conventionally arranged one adjacent to the other and embedded in a synthetic support which is attached to the bearing base by adhesion or some other way. The individual attachment of retroreflectors to a base by means of asphalt has already been suggested (cf. U.S. Re Pat. No. 20,731). On the other hand, in order to make textiles, for example the protective clothing of traffic policemen, retroreflecting, small spheres having a diameter of the order of magnitude of $10-100\mu$ are embedded in the surface of films such that a portion of these small spheres is exposed. The embedded surface of each small sphere is metallized, while from the exposed portion the metal coating is removed. It has also been already suggested to back a transparent small sphere completely with a reflecting foil disposed in its focal surface.

SUMMARY OF THE INVENTION

The invention provides for equipping garments with retroreflectors by integrating the retroreflectors into elements which can be attached individually by adhesion on the garments.

The absolute upper limit of the height of such elements is limited by the fact that particles projecting too far beyond the surface of the garment are torn off relatively easily. At heights under 1 mm, on the other hand, the retroreflecting properties can only with difficulty be reproducibly produced. The height of the element preferably is 1 to 5 mm, further preferably 1 to 3 mm.

The reliability of the adhesion of the decoration or decorative article according to the invention can be increased by providing that the diameter of the adhesive surface is greater than the diameter of the incident surface. This is achieved, on the one hand, by providing that the reflecting back of the retroreflector has a greater diameter than the incident surface, and on the other hand, by providing that the element has a collar encompassing the retroreflector. On the basis of this measure it is readily possible without encountering difficulties to use classic retroreflectors whose height is greater than their greatest diameter. The provided collar encompassing the retroreflector can be provided with obliquely inclined planar facets. Such oblique outer surfaces decrease the danger of tearing off the retroreflectors. On the other hand, the facets emphasize the decorative character of the elements and make their technical function optically less noticeable.

The invention lends to the known decorative glass patterns a safety function since the wearer of the garment in t dark surrounding becomes more visible to the driver of an illuminated motor vehicle, which reduces the risk of accidents. The decorative effect of the decoration is also potentially increased through the built-in retroreflectors if the wearer of the garment is illuminated by a light source in dark surroundings, for example in a dance bar.

BRIEF DESCRIPTION OF THE DRAWINGS

Further details of the invention will be discussed in the following in conjunction with the drawings, wherein:

FIGS. 1 to 4 respectively are a top view, a vertical section, an oblique view from above, and an oblique view from below of a retroreflecting element;

DETAILED DESCRIPTION OF THE INVENTION

Figure 5:
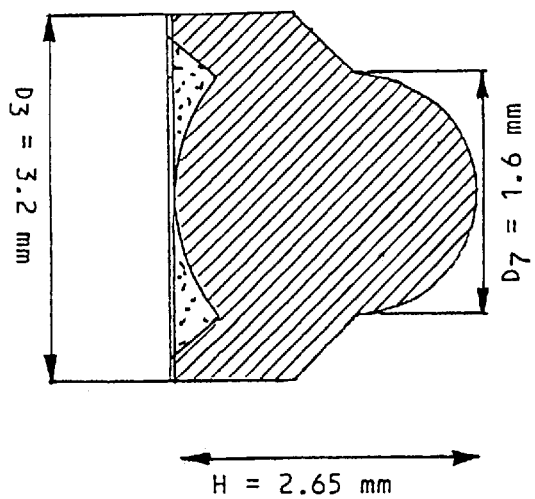
FIGS. 5 to 7 respectively are a vertical section, an oblique view from below, and an oblique view from above of a second embodiment.

An element or body 1 depicted in FIGS. 1 to 4 preferably is formed of glass, however it can also be fabricated of synthetic material. The element 1 comprises a retroreflector 11 with incident surface 7 and reflecting back 4. This retroreflector is encompassed at its circumference by a collar 12 of body 1. Depending on its angle of incidence, light incident on the incident surface 7 of the retroreflector 11 is focused onto different sites of the spherical back 4 of the retroreflector 11 provided with a reflecting coating. The curved back 4 is encompassed by rim 5 of a rear end of collar 12. Such rim has a planar rear edge. On this edge and on the back 4 of the retroreflector 11 an adhesive 2, in particular a melt adhesive, is disposed which defines a flat or planar adhesive surface 3. The side walls of element 1 can be provided with facets 6. In FIG. 4 the adhesive 2 is omitted so that the shape of the back 4 within rim 5 is more clearly discernible. The adhesive can have a diameter greater than the height of the element, and such height is greater than the diameter of the incident surface.

Figure 6:
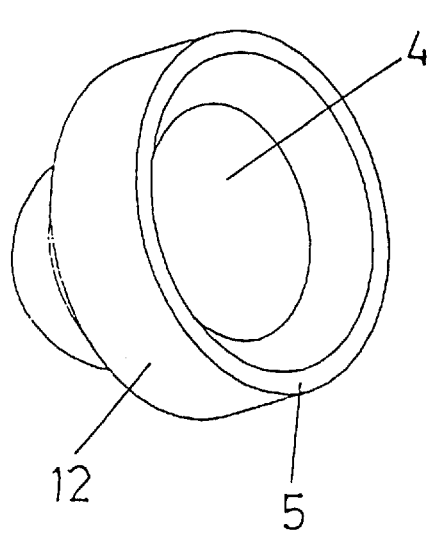
Figure 7:
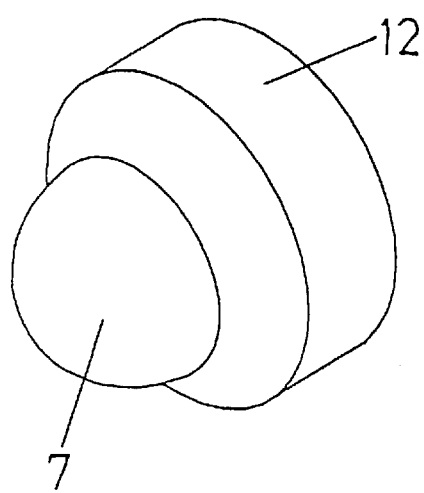
Figure 8:
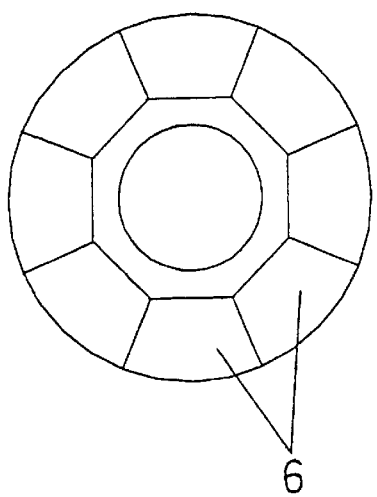
FIGS. 8 to 12 respectively are a top view, a side view, a view in vertical section, an oblique view from above, and an oblique view from below of a third embodiment.
Figure 9:
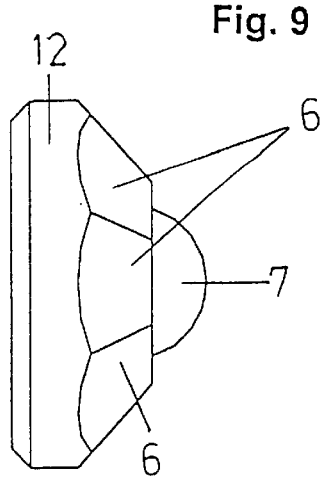
Figure 10:
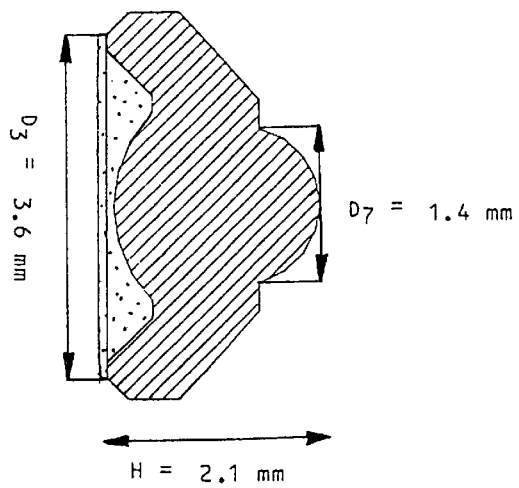
Figure 11:
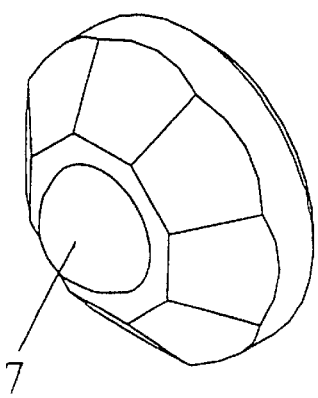
Figure 12:
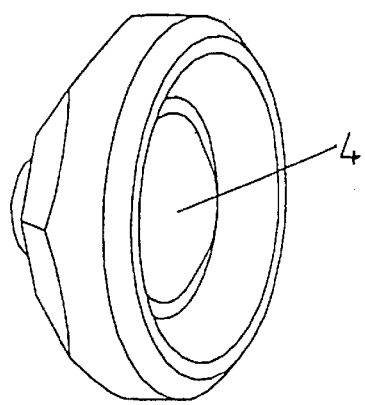

In the embodiment according to FIGS. 5–7 a relatively wide collar 12 is provided, which ensures that a traverse dimension, i.e., a diameter D3 of the adhesive surface 3 is significantly greater than a traverse dimension, i.e., a diameter D7, of the incident surface 7 of the retroreflector 11. The relatively great height of collar 12, together with its oblique extension in retroreflector 11, prevents the collar from breaking off and the element 1 from being detached.

The embodiment according to FIGS. 8 to 12 differs from that depicted in FIGS. 5 to 7 by having a flatter design, i.e. a lower ratio of height H to diameter D3 of the adhesive surface. This is customary with conventional ironed-on precious/semi-precious stones. Thereby, the collar 12 encompassing the retroreflector 11 is relatively wide. In order for this region to be included for the decorative effect of element 1, it is provided with planar facets 6. Metallizing the back 4 of retroreflector 11 preferably takes place by vapor deposition, since thereby the heated adhesive 2 is incapable of destroying such metallization when ironing on the elements 1.

Figure 13:
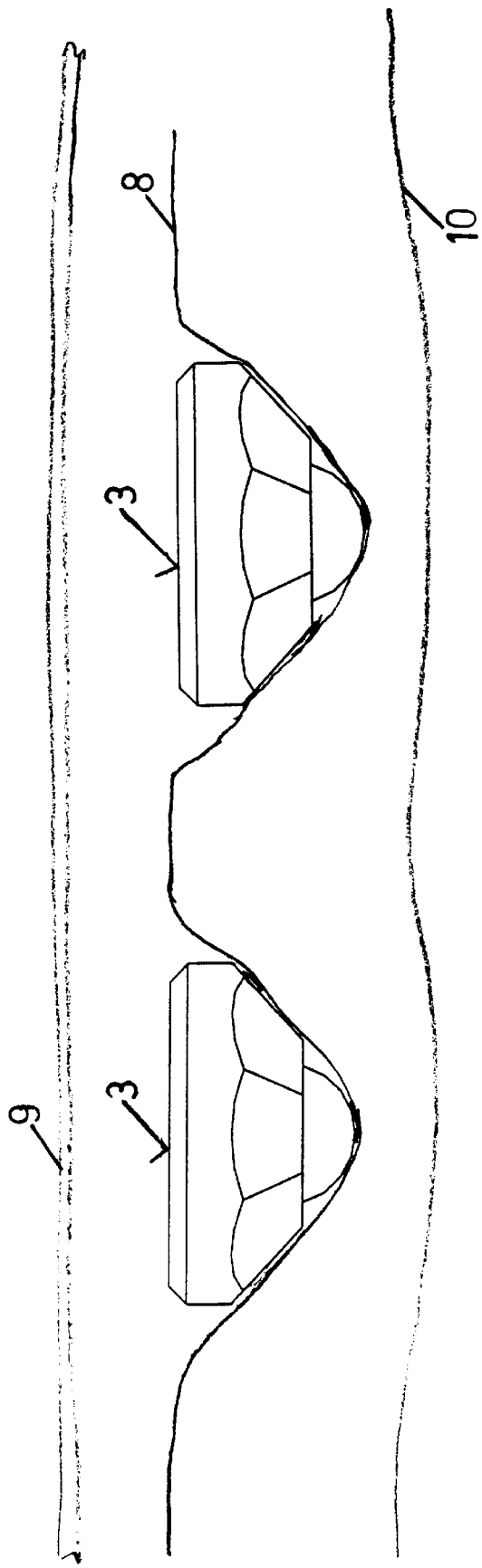
FIG. 13 is a side view illustrating schematically the application of elements according to the invention.

Application of the elements 1 according to the invention is carried out by a transfer method known per se which is shown schematically in FIG. 13. The stones are attached or mounted with their front surface on an adhesive film 8 which in the region between the stones extends in the same plane as the adhesive surfaces 3 of elements 1. After pulling off a protective film covering the adhesive surfaces 3 during transport, which film is not shown in FIG. 13, film 8 loosely adhering to garment 9 is placed onto an ironing pad 10. By ironing the garment 9, connection between garment 9 and elements 1 is established. Lastly, film 8 is pulled off.

The garment produced in the described manner is not only decorative, it ensures moreover also that even with strongly oblique incidence of light onto the retroreflectors attached to the garment, a strong reflection in the direction of the light source occurs.

What is claimed is:

1. A decorative element for application to a garment, said decorative element comprising:
   a body of glass or synthetic material and having a front side and a back side, said body comprising:
      a retroreflector having a front side and a back side, said front side of said retroreflector being bounded by a transparent convex incident surface for the entrance of incident light, and said back side of said retroreflector being coated with a reflecting material and extending in a focal surface of the incident light; and
      a collar surrounding said retroreflector, said collar having a rear end in the form of rim having a planar rear edge and surrounding said back side of said retroreflector; and
   an adhesive having a front side and a back side, said front side of said adhesive being adhered to said back side of said body and covering said back side of said retroreflector, said back side of said adhesive defining a planar adhesive surface to be applied to the garment, and said planar adhesive surface having a transverse dimension greater than a transverse dimension of said incident surface.

2. An element as claimed in claim 1, wherein said front side of said retroreflector is bounded by a spherical surface.

3. An element as claimed in claim 1, having a height of from 1 to 5 mm.

4. An element as claimed in claim 1, having a height of from 1 to 3 mm.

5. An element as claimed in claim 1, wherein said adhesive surface has a diameter greater than a diameter of said incident surface.

6. An element as claimed in claim 1, wherein said adhesive surface has a diameter greater than a height of said element, and said height is greater than a diameter of said incident surface.

7. An element as claimed in claim 1, wherein said collar includes obliquely inclined planar facets.

8. An element as claimed in claim 1, wherein said back side of said retroreflector is metallized by vapor deposition.

9. An element as claimed in claim 1, wherein said back side of said retroreflector is defined by a curved surface.

10. A garment having a decoration formed by a plurality of decorative elements, each said decorative element comprising:
    a body of glass or synthetic material and having a front side and a back side, said body comprising:
       a retroreflector having a front side and a back side, said front side of said retroreflector being bounded by a transparent convex incident surface for the entrance of incident light, and said back side of said retroreflector being coated with a reflecting material and extending in a focal surface of the incident light; and
       a collar surrounding said retroreflector, said collar having a rear end in the form of rim having a planar rear edge and surrounding said back side of said retroreflector; and
    an adhesive having a front side and a back side, said front side of said adhesive being adhered to said back side of said body and covering said back side of said retroreflector, said back side of said adhesive defining a planar adhesive surface applied to said garment, and said planar adhesive surface having a transverse dimension greater than a transverse dimension of said incident surface.

11. A garment as claimed in claim 10, wherein said front side of said retroreflector is bounded by a spherical surface.

12. A garment as claimed in claim 10, having a height of from 1 to 5 mm.

13. A garment as claimed in claim 10, having a height of from 1 to 3 mm.

14. A garment as claimed in claim 10, wherein said adhesive surface has a diameter greater than a diameter of said incident surface.

15. A garment as claimed in claim 10, wherein said adhesive surface has a diameter greater than a height of said element, and said height is greater than a diameter of said incident surface.

16. A garment as claimed in claim 10, wherein said collar includes obliquely inclined planar facets.

17. A garment as claimed in claim 10, wherein said back side of said retroreflector is metallized by vapor deposition.

18. A garment as claimed in claim 10, wherein said back side of said retroreflector is defined by a curved surface.

19. A garment having thereon a decoration formed by a plurality of decorative elements, each said decorative element comprising:
    a body including a retroreflector and a collar surrounding said retroreflector, said collar having a rear end in the form of a rim having a planar rear edge and surrounding a back side of said retroreflector.

20. A product for applying a decoration to a garment, said product comprising:
    a plurality of decorative elements to be applied to the garment by pressure and heat, each said decorative element comprising:
       a body of glass or synthetic material and having a front side and a back side, said body comprising:
          a retroreflector having a front side and a back side, said front side of said retroreflector being bounded by a transparent convex incident surface for the entrance of incident light, and said back side of said retroreflector being coated with a reflecting material and extending in a focal surface of the incident light; and a collar surrounding said retroreflector, said collar having a rear end in the form of rim having a planar rear edge and surrounding said back side of said retroreflector; and an adhesive having a front side and a back side, said front side of said adhesive being adhered to said back side of said body and covering said back side of said retroreflector, said back side of said adhesive defining a planar adhesive surface to be applied to the garment, and said planar adhesive surface having a transverse dimension greater than a transverse dimension of said incident surface; and an adhesive film, attached to said front side of said body of each of said elements and to be attached temporarily to the garment, for positioning said elements with respect to the garment during connection of said elements to the garment by the application of pressure and heat, whereafter such connection said adhesive film is removable from said bodies and from the garment.

* * * * *